United States Patent
Horton et al.

(10) Patent No.: US 6,779,050 B2
(45) Date of Patent: Aug. 17, 2004

(54) SYSTEM AND METHOD FOR HARDWARE BASED REASSEMBLY OF A FRAGMENTED PACKET

(75) Inventors: John D. Horton, Alpharetta, GA (US); Niki R. Pantelias, Duluth, GA (US)

(73) Assignee: Broadcom Corporation, Irvine, CA (US)

( * ) Notice: Subject to any disclaimer, the term of this patent is extended or adjusted under 35 U.S.C. 154(b) by 291 days.

(21) Appl. No.: 09/960,725

(22) Filed: Sep. 24, 2001

(65) Prior Publication Data

US 2003/0061415 A1 Mar. 27, 2003

(51) Int. Cl.[7] .............................. G06F 3/00; H04L 12/56
(52) U.S. Cl. ......................................... 710/30; 370/474
(58) Field of Search .............................. 710/32, 30, 62, 710/72; 370/389, 509, 474, 471

(56) References Cited

U.S. PATENT DOCUMENTS

| | | | | |
|---|---|---|---|---|
| 5,396,490 A | * | 3/1995 | White et al. ................ 370/474 |
| 5,781,549 A | * | 7/1998 | Dai ............................ 370/398 |
| 6,216,171 B1 | * | 4/2001 | Isono et al. ................ 709/250 |
| 6,263,444 B1 | * | 7/2001 | Fujita ........................ 713/201 |
| 6,438,123 B1 | * | 8/2002 | Chapman .................... 370/351 |
| 6,515,990 B1 | * | 2/2003 | Leung ........................ 370/389 |

\* cited by examiner

*Primary Examiner*—Kim Huynh
(74) *Attorney, Agent, or Firm*—Sterne, Kessler, Goldstein & Fox P.L.L.C.

(57) ABSTRACT

A system and method for hardware based reassembly of a fragmented packet is shown. The method includes receiving a bandwidth request to transfer a data packet from the data provider. Then, bandwidth is allocated to the data provider, where the allocated bandwidth is less than the requested bandwidth. Next, the present invention receives part of the data packet in the allocated bandwidth from the data provider, where the part of the data packet includes a fragment header, and the fragment header includes a sequence number for the part of the data packet. The part of the data packet is then stored in external memory. Finally, the data packet is reassembled by concatenating in the correct sequence the part of the data packet with other parts of the data packets to create the reassembled data packet.

17 Claims, 3 Drawing Sheets

SYSTEM AND METHOD FOR HARDWARE BASED REASSEMBLY OF A FRAGMENTED PACKET

BACKGROUND OF THE INVENTION

1. Field of the Invention

The present invention is generally related to offloading cable modem termination system (CMTS) software by using hardware to reassemble fragmented frames or packets from a cable modem.

2. Related Art

The importance to the modern economy of rapid data access and exchange cannot be overstated. This explains the exponentially increasing popularity of the data access and exchange via cable networks (including coaxial cable or Hybrid fiber coaxial cable), the Internet, intranets, wireless networks, satellites, optical and so forth (i.e., communication mediums). Rapid data access and exchange is partly dependent upon how efficiently bandwidth is allocated to a data provider in order for the data provider to transfer the requested data to a user via one of the communication mediums mentioned above.

One very desirable solution for rapid data access and exchange is via cable networks and cable modems. Cable modems provide asynchronous communications on cable networks. In general, a user connects a cable modem to the TV outlet for his or her cable TV, and the cable TV operator connects a cable modem termination system ("CMTS") in the operator's headend. The CMTS is a central device for connecting the cable network to a data network like the Internet. The CMTS is a central distribution point for a cable system. Data flows "downstream" from the CMTS to the cable modem (i.e., downstream communication). Alternatively, data flows "upstream" from the cable modem to the CMTS (i.e., upstream communication).

A common cable modem standard today is the Data Over Cable Service Interface Specification ("DOCSIS"). DOCSIS defines technical specifications for both cable modems and CMTS.

In general, a cable modem forwards or provides data via asynchronous communications on cable networks. The cable modem receives data from a user that needs to be transferred via a cable network. For many types of data, in order for the cable modem to transfer the data via a cable network it must request that the CMTS grant to it the necessary bandwidth to send a data packet or frame. At times the CMTS only grants the cable modem enough bandwidth to send part of the packet. In this case, the cable modem sends as much of the packet as will fit in the bandwidth grant, along with a special "fragment header" indicating that it is sending a fragment and including a sequence number for the fragment and flags indicating when the fragment is the first or last fragment of the packet. With fragmentation, a cyclic redundancy check (CRC) is appended to the fragment that covers only the bytes in the fragment.

Subsequent bandwidth grants from the CMTS maybe large enough to fill all or part of the remainder of the packet. In the case where only part of the remainder of the packet fits in the granted bandwidth, the cable modem sends another fragment as above, and so on until the entire remainder of the packet fits in a bandwidth grant. When the cable modem sends a final fragment in the packet, the cable modem sets a flag indicating that this fragment is the last fragment in the packet.

At the CMTS, fragments sent by the cable modem must be reassembled to reconstruct the original frame or packet by the CMTS software. The reassembly operation involves removing the special fragment header and CRC, combining the data from each fragment in the correct order, maintaining the session state, and using the session state to check for error conditions such as lost fragments or incorrect sequence numbers. These functions must be performed separately for each cable modem (i.e., data provider) and for each flow from a particular cable modem.

The reassembly of fragmented frames is handled by software running on an embedded CPU in the CMTS. This requires the CMTS software to do detailed parsing of every frame, even non-fragmented ones (since arrival of a non-fragmented frame can affect the state of a fragmentation session). This burden on software reduces system performance and increases cost by requiring a higher performance CPU or multiple CPUs.

SUMMARY OF THE INVENTION

The present invention, by using hardware instead of software to reassemble fragmented frames or packets from a data provider, obtains significant savings in CPU cycles for the CMTS software.

In an embodiment of the present invention, the method includes receiving a bandwidth request to transfer a data packet from the data provider. Then, bandwidth is allocated to the data provider, where the allocated bandwidth is less than the requested bandwidth. Next, the present invention receives part of the data packet in the allocated bandwidth from the data provider, where the part of the data packet includes a fragment header, and the fragment header includes a sequence number for the part of the data packet. The part of the data packet is then stored in external memory. Finally, the data packet is reassembled by concatenating in the correct sequence the part of the data packet with other parts of the data packets to create the reassembled data packet.

BRIEF DESCRIPTION OF THE FIGURES

The present invention will be described with reference to the accompanying drawings, wherein.

DETAILED DESCRIPTION OF THE PREFERRED EMBODIMENTS

A. Overview of the Invention

The present invention, by using hardware instead of software to reassemble fragmented frames or packets from a data provider, obtains significant savings in CPU cycles for the CMTS software. For illustration purposes, the present invention is described in terms of being utilized with a cable network. It should be understood that the present invention is not limited to use with a cable network. In fact, the present invention may be used with any communication medium, including but not limited to, the Internet, intranets, fiber optic networks, wireless networks and satellites.

Data in the present invention includes any type of information that is deterministic (such as voice traffic), as well as with best effort data traffic including but not limited to digital, voice, video, and audio. An example operating environment of the present invention is described next.

B. Example Operating Environment

Figure 1:
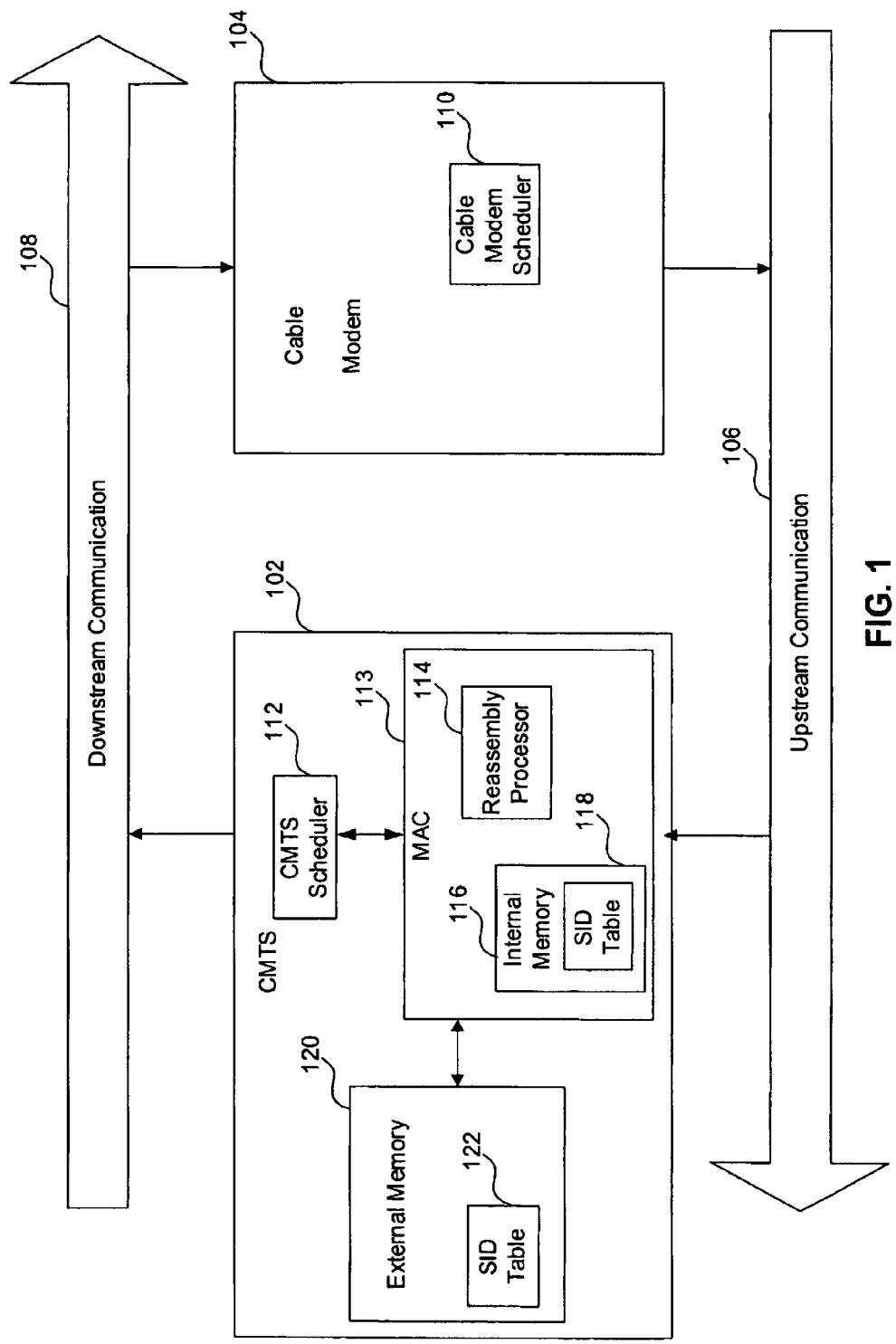
FIG. 1 is a block diagram representing an example operating environment according to an embodiment of the present invention.

FIG. 1 is a block diagram representing an example operating environment of the present invention. It should be understood that the example operating environment in FIG. 1 is shown for illustrative purposes only and does not limit the invention. Referring to FIG. 1, a cable modem termination system (CMTS) 102, a cable modem 104, downstream communication 108 and upstream communication 106 are shown. Cable modem 104 further includes a cable modem scheduler 110. CMTS 102 further includes a CMTS scheduler 112, a MAC 113 (media access controller) and an external memory 120. MAC 113 includes a reassembly processor 114 and an internal memory 116. Internal memory 116 includes a SID (service identifier) table 118. External memory 120 includes a SID table 122. Each of these components will be briefly described next.

In general, cable modem 104 forwards or provides data via asynchronous communications on cable networks via upstream communication 106. Cable modem 104 receives data from a user that needs to be transferred via a cable network. For many types of data, in order for cable modem 104 to transfer the data via a cable network it must request that CMTS 102 grant to it the necessary bandwidth via downstream communication 108 to send a data packet or frame.

Cable modem scheduler 110 of cable modem 104 is responsible for multiplexing the internal traffic (i.e., requesting the necessary bandwidth that cable modem 104 needs to transfer its current types of data). Cable modem scheduler 110 must take into consideration the different priorities given to the current data to be transferred and to request bandwidth from CMTS 102 accordingly.

CMTS 102 is a central device for connecting the cable network to a data network. CMTS scheduler 112 is a bandwidth manager that decides how to grant available bandwidth according to the current bandwidth requests. A connection admission control (not shown) decides whether or not to admit more traffic in the system.

As mentioned above, in order for cable modem 104 to transfer data via a cable network it must request that CMTS 102 grant to it the necessary bandwidth via downstream communication 108 to send a data packet or frame. At times CMTS 102 only grants cable modem 104 enough bandwidth to send part of the packet. In this case, cable modem 104 sends as much of the packet as will fit in the bandwidth grant, along with a special "fragment header" indicating that it is sending a fragment. The fragment header includes, but is not limited to, a sequence number for the fragment (indicating the fragment's order in the data packet) and flags indicating when the fragment is the first or last fragment of the packet. With fragmentation, a CRC (cyclic redundancy check) is appended to the fragment that covers only the bytes in the fragment. CRC is described in more detail below.

Subsequent bandwidth grants from CMTS 102 may be large enough to fill all or part of the remainder of the packet. In the case where only part of the remainder of the packet fits in the granted bandwidth, cable modem 104 sends another fragment as above, and so on until the entire remainder of the packet fits in a bandwidth grant. When cable modem 104 sends a final fragment in the packet, cable modem 104 sets a flag indicating that this fragment is the last fragment in the packet.

Reassembly processor 114 is responsible for reassembling the data fragments, thereby offloading the CMTS software. Reassembly processor 114 maintains SID table 118 in internal memory 116 and SID table 122 in external memory 120. SID table 118 in internal memory 116 contains a bit per SID to indicate if a reassembly session is in progress for that SID. The present invention use of internal memory 116 reduces processing time and improves performance since the "session in progress" status must be checked for every packet that arrives from cable modem 104 and access to internal memory 116 is much faster than access to external memory 120. If there is no reassembly session in progress, SID table 122 of external memory 120 need not be accessed at all, so the choice of the present invention to store the information it does in internal memory 116 also gives a performance improvement. SID table 122 in external memory 120 stores all other state information for reassembly sessions in progress.

Internal table 118 in internal memory 116 is kept small by the present invention to reduce silicon area, yet provides the critical information to decide if further action is required in low latency internal memory. The larger state information is kept in external memory 120.

Reassembly processor 114 provides a method to detect fragment received from cable modem 104. The fragments are associated by the SID number from which the fragment was received and the sequence number contained in the fragment header. Received fragments are stored in external memory 120 until all fragments of a particular session are received. Correct sequencing of the fragments are assured by the sequence number. Once the last flag indicates that all fragments are received, reassembly processor 114 reassembles the fragments by concatenating the correctly sequenced fragments. When a sequencing error occurs, then the received fragment is discarded. Key features of the present invention is the ability to store packets or fragments for varying amounts of time and the ability to tag the fragments with the SID and sequence numbers.

As stated above, a CRC is appended to the fragment that covers only the bytes in the fragment. A CRC is created by passing the fragment data through an algorithm (either hardware and/or software) to create a unique value from the fragment data. This value (i.e., CRC) is sent along with the packet to CMTS 102, and at CMTS 102 the same operation is repeated and the new value compared to the sent value. If the two values match, then there is a high probability the received data is correct.

The details of how reassembly processor 114 of present invention bypasses the CMTS software and reassembles fragmented frames or packets from a data provider (thereby obtaining significant savings in CPU cycles for the CMTS software), is described next with the flowchart in FIG. 2.

C. Method of the Present Invention According to an Embodiment

Figure 2:
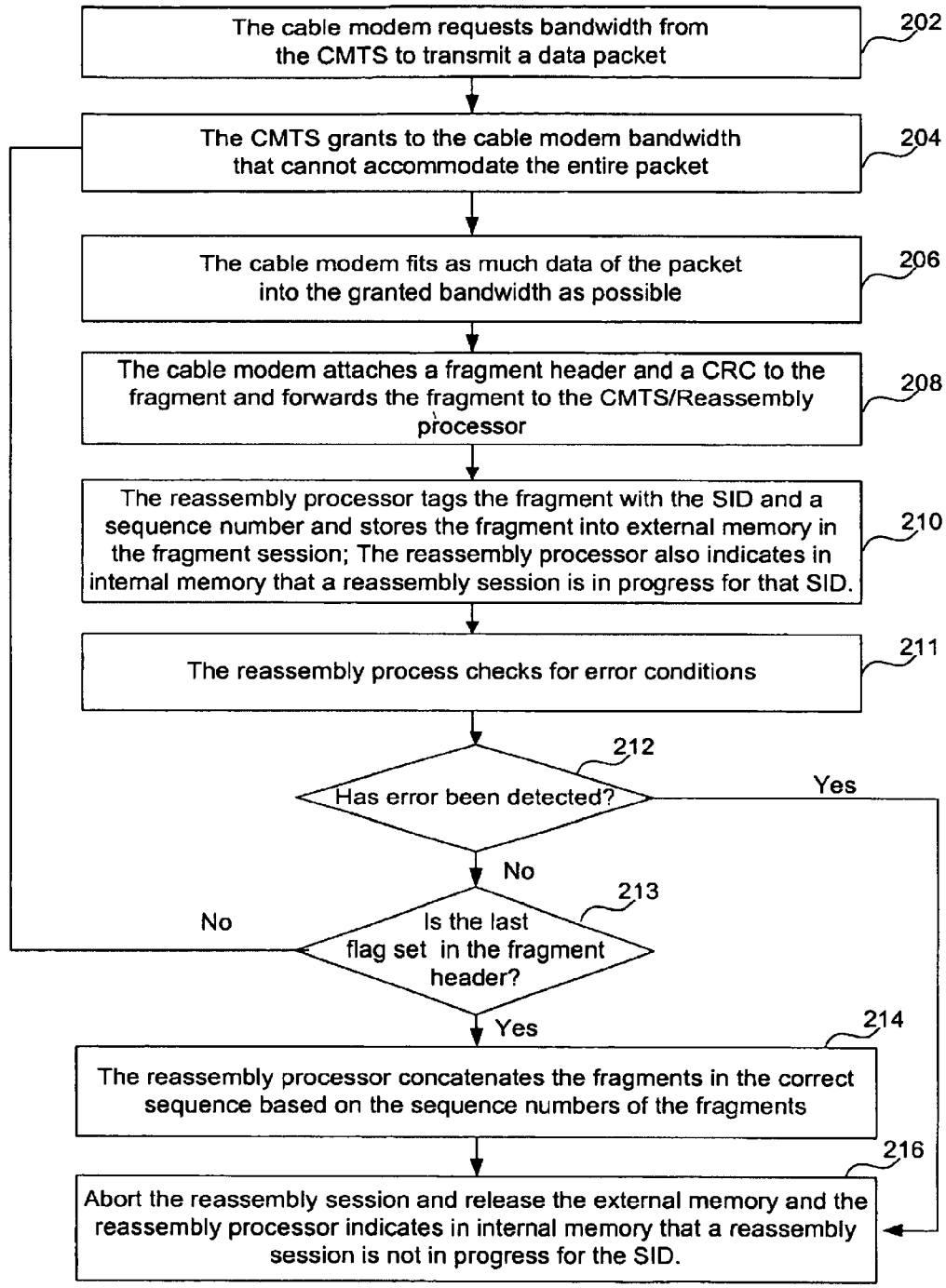
FIG. 2 illustrates a high level operational embodiment of the present invention.

The flowchart in FIG. 2 starts at step 202. In step 202, cable modem 104 requests bandwidth from CMTS 102 in order to transmit a data packet. Control then passes to step 204.

In step 204, CMTS 102 grants to cable modem 104 bandwidth that cannot accommodate the entire original data packet. Control then passes to step 206.

In step 206, cable modem 104 fits as much data as possible into the granted bandwidth. Control then passes to step 208.

In step 208, cable modem 104 attaches a fragment header and a CRC to the fragment and forwards the fragment in the granted bandwidth to reassembly processor 114. Control then passes to step 210.

In step 210, reassembly processor 114 tags the fragment with the SID and sequence number and stores the fragment in external memory 120 for the fragment session. For the first fragment of the data packet, reassembly processor 114 indicates in SID table 118 in internal memory 116 that a reassembly session is in progress for the SID. Control then passes to step 211.

In step 211, reassembly processor 114 checks for error conditions. An error condition would occur if one of the fragments was lost while it was being transferred from cable modem 104 via upstream communication. Reassembly processor 114 notes this type of error may have occurred when there is a missing sequence number (e.g., the sequence numbers have incremented by a number other than one). Also, if reassembly processor 114 receives a first flag set for the a SID (indicating a new call for the SID) prior to it receiving the last flag set for the same SID already being processed, then it knows the last fragment for the SID being processed has been lost. Control then passes to step 212.

In step 212, if an error has been detected, then control passes to step 216 where the reassembly session is aborted and external memory released. Alternatively, control passes to step 213.

In step 213, reassembly processor 114 determines whether the last fragment received has its last flag set in the header fragment. If the last flag is set (indicating that this fragment is the last fragment in the data packet), then control passes to step 214. If the last flag is not set (indicating that there are still more fragments remaining in the data packet), then control passes to step 204. Here, steps 204 through 212 are repeated until the last flag is set in a fragment.

In step 214, reassembly processor 114 concatenates the fragments in the correct sequence based on the sequence numbers of the fragments. The logic of the present invention performs reassembly including error checking. In an embodiment, the combination of fragments into a complete packet is accomplished with a linked list data structure. Here, when each new fragment is stored to memory, a pointer to it is stored along with the previous fragment. When the last bit indicates that the final fragment has been linked to the list, all fragments are read in beginning with the first and following the links in the linked list to subsequent fragments to give the whole packet (or frame). An advantage of using a linked list data structure is that memory can be allocated in fragment-sized chunks and as many chunks as needed can be linked together, rather than allocating enough memory for a maximum-length reassembled packet even if the final reassembled packet ends up being shorter in length. Control then passes to step 216.

In step 216, reassembly processor 114 aborts the reassembly session and releases the memory utilized in external memory 120 to store the fragments. The number of reassembly sessions is not limited by the processing of reassembly processor 114 itself, but only by memory available to hold fragments. Reassembly processor 114 also indicates in SID table 118 in internal memory 116 that a reassembly session is no longer in progress for the SID. A mechanism may also be provided by the invention to enable manual aborting of reassembly sessions. To use this mechanism, the CMTS software indicates for which SID it wants to abort reassembly, and reassembly processor 114 frees up any memory in use and clears the state for that reassembly session. The CMTS software could use the manual aborting feature of the present invention when it deallocates a SID in order to guarantee that memory in use for fragments from the deallocated SID is freed. The flowchart in FIG. 2 ends at this point.

D. Example Environment of the Present Invention

Figure 3:
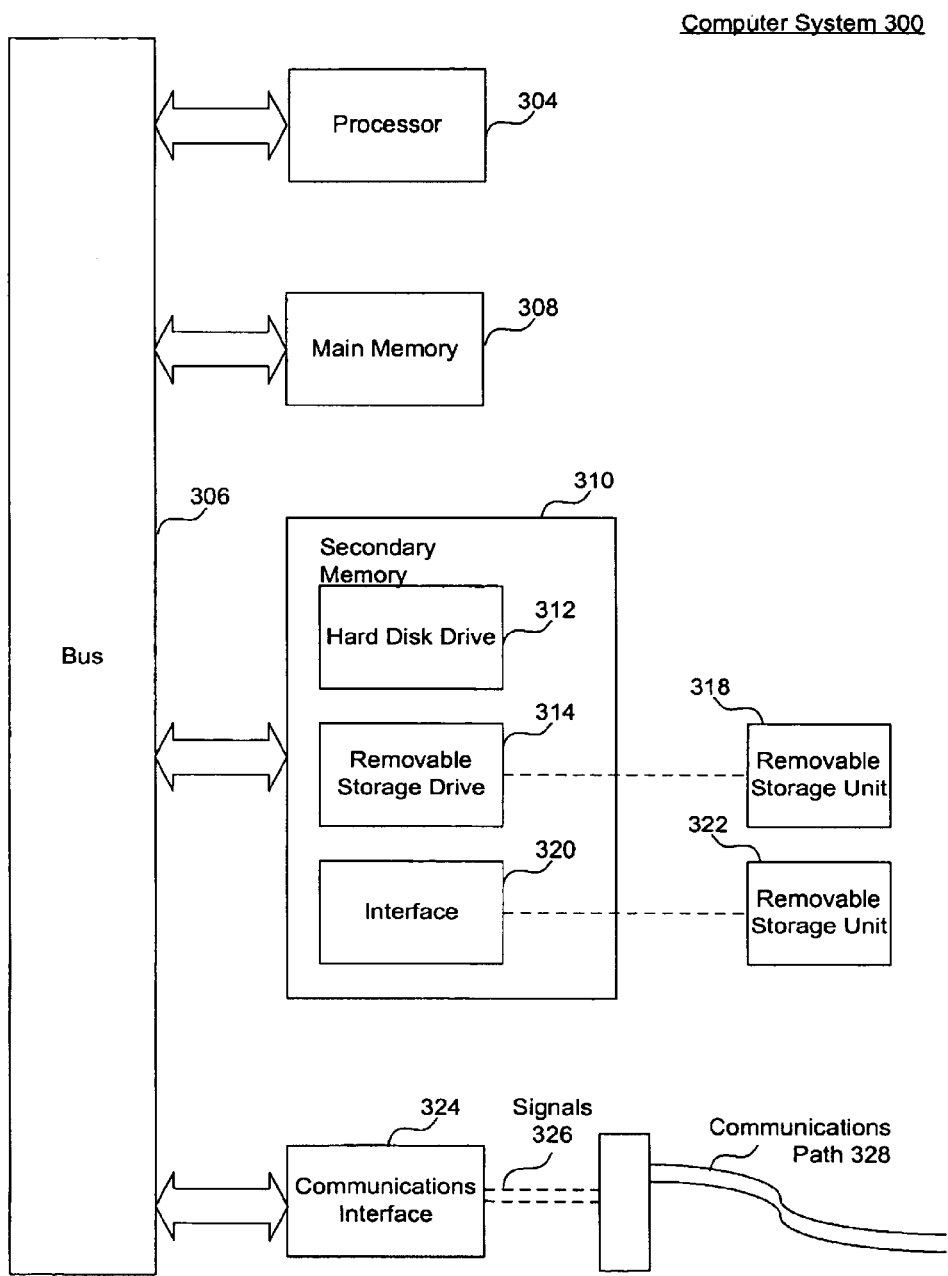
FIG. 3 is a block diagram illustrating how CMTS, CMTS scheduler, cable modem scheduler, cable modem and reassembly processor may be implemented according to an embodiment of the invention.

CMTS 102, CMTS scheduler 112, cable modem 104, cable modem scheduler 110, MAC 113 and reassembly processor 114 may be implemented using computer 300 as shown in FIG. 3. Obviously, more than one of these functional components could be implemented on a single computer 300.

The present invention may be implemented using hardware, software or a combination thereof and may be implemented in a computer system or other processing system. In fact, in one embodiment, the invention is directed toward one or more computer systems capable of carrying out the functionality described herein. The computer system 300 includes one or more processors, such as processor 304. The processor 304 is connected to a communication bus 306. Various software embodiments are described in terms of this example computer system. After reading this description, it will become apparent to a person skilled in the relevant art how to implement the invention using other computer systems and/or computer architectures.

Computer system 300 also includes a main memory 308, preferably random access memory (RAM), and can also include a secondary memory 310. The secondary memory 310 can include, for example, a hard disk drive 312 and/or a removable storage drive 314, representing a floppy disk drive, a magnetic tape drive, an optical disk drive, etc. The removable storage drive 314 reads from and/or writes to a removable storage unit 318 in a well known manner. Removable storage unit 318, represents a floppy disk, magnetic tape, optical disk, etc. which is read by and written to by removable storage drive 314. As will be appreciated, the removable storage unit 318 includes a computer usable storage medium having stored therein computer software and/or data.

In alternative embodiments, secondary memory 310 may include other similar means for allowing computer programs or other instructions to be loaded into computer system 300. Such means can include, for example, a removable storage unit 322 and an interface 320. Examples of such can include a program cartridge and cartridge interface (such as that found in video game devices), a removable memory chip (such as an EPROM, or PROM) and associated socket, and other removable storage units 322 and interfaces 320 which allow software and data to be transferred from the removable storage unit 318 to computer system 300.

Computer system 300 can also include a communications interface 324. Communications interface 324 allows software and data to be transferred between computer system 300 and external devices. Examples of communications interface 324 can include a modem, a network interface (such as an Ethernet card), a communications port, a PCM-CIA slot and card, etc. Software and data transferred via communications interface 324 are in the form of signals which can be electronic, electromagnetic, optical or other signals capable of being received by communications interface 324. These signals 326 are provided to communications interface via a channel 328. This channel 328 carries signals 326 and can be implemented using wire or cable, fiber optics, a phone line, a cellular phone link, an RF link and other communications channels.

In this document, the terms "computer program medium" and "computer usable medium" are used to generally refer to media such as removable storage device 318, a hard disk installed in hard disk drive 312, and signals 326. These computer program products are means for providing software to computer system 300.

Computer programs (also called computer control logic) are stored in main memory and/or secondary memory 310. Computer programs can also be received via communications interface 324. Such computer programs, when executed, enable the computer system 300 to perform the features of the present invention as discussed herein. In particular, the computer programs, when executed, enable the processor 304 to perform the features of the present invention. Accordingly, such computer programs represent controllers of the computer system 300.

In an embodiment where the invention is implemented using software, the software may be stored in a computer program product and loaded into computer system 300 using removable storage drive 314, hard drive 312 or communications interface 324. The control logic (software), when executed by the processor 304, causes the processor 304 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s). In yet another embodiment, the invention is implemented using a combination of both hardware and software.

E. Conclusion

While various embodiments of the present invention have been described above, it should be understood that they have been presented by way of example, and not limitation. It will be apparent to persons skilled in the relevant art that various changes in form and detail may be made therein without departing from the spirit and scope of the invention. This is especially true in light of technology and terms within the relevant art(s) that may be later developed. Thus, the present invention should not be limited by any of the above-described example embodiments, but should be defined only in accordance with the following claims and their equivalents.

What is claimed is:

1. A system for reassembling fragmented packets from a data provider, comprising:
    means for receiving a bandwidth request to transfer a data packet from the data provider;
    means for allocating bandwidth to the data provider, wherein said allocated bandwidth is less than said requested bandwidth;
    means for receiving part of said data packet in said allocated bandwidth from the data provider, wherein said part of said data packet includes a fragment header, wherein said fragment header includes a sequence number for said part of said data packet;
    means for tagging said part of said data packet with information indicating whether a reassembly session is in progress;
    means for storing said part of said data packet in external memory; and
    means for reassembling said data packet by concatenating in the correct sequence said part of said data packet with other parts of said data packet, thus forming a reassembled data packet.

2. The system of claim 1, wherein said data provider is a cable modem.

3. The system of claim 1, wherein said means for reassembling uses a linked list to reassemble said reassembled data packet.

4. The system of claim 1, further comprising a means for error checking said reassembled data packet.

5. The system of claim 1, wherein said reassembled data packet is associated with a service identifier.

6. The system of claim 5, further comprising:
    means for indicating that said service identifier is in a reassembly state; and
    means for indicating that said service identifier is no longer in a reassembly state once said data packet is created.

7. A method for reassembling fragmented packets from a data provider, comprising the steps of:
    receiving a bandwidth request to transfer a data packet from the data provider;
    allocating bandwidth to the data provider, wherein said allocated bandwidth is less than said requested bandwidth;
    receiving part of said data packet in said allocated bandwidth from the data provider, wherein said part of said data packet includes a fragment header, wherein said fragment header includes a sequence number for said part of said data packet;
    tagging said part of said data packet with information indicating whether a reassembly session is in progress;
    storing said part of said data packet in external memory; and
    reassembling said data packet by concatenating in the correct sequence said part of said data packet with other parts of said data packet, thus forming a reassembled data packet.

8. The method of claim 7, wherein said data provider is a cable modem.

9. The method of claim 7, wherein said step of reassembling uses a linked list to create said reassembled data packet.

10. The method of claim 7, further comprising the step of error checking said reassembled data packet.

11. The method of claim 7, wherein said reassembled data packet is associated with a service identifier.

12. The method of claim 11, further comprising the steps of:
    indicating that said service identifier is in a reassembly state; and
    indicating that said service identifier is no longer in a reassembly state once said reassembled data packet is created.

13. A system for reassembling fragmented packets from a data provider, comprising:
    a cable modem termination system for receiving a bandwidth request to transfer a data packet from a data provider, wherein said cable modem termination system allocates bandwidth to the data provider, wherein said allocated bandwidth is less than said requested bandwidth, wherein said cable modem termination system receives part of said data packet in said allocated bandwidth from the data provider, wherein said part of said data packet includes information indicating whether a reassembly session is in progress and a fragment header, wherein said fragment header includes a sequence number for said part of said data packet; and
    a reassembly processor for storing said part of said data packet in external memory, wherein said reassembly processor reassembles said data packet by concatenating in the correct sequence said part of said data packet with other parts of said data packet, thus forming a reassembled data packet.

14. The system of claim 13, wherein said data provider is a cable modem.

15. The system of claim 13, wherein said reassembly processor uses a linked list to reassemble said reassembled data packet.

16. The system of claim 13, wherein said reassembly processor performs error checking on said reassembled data packet.

17. The system of claim 13, wherein said reassembled data packet is associated with a service identifier.

* * * * *